United States Patent [19]

Akin

[11] 4,154,856
[45] May 15, 1979

[54] METHOD FOR STRETCHING A COAGULABLE EXTRUDATE

[75] Inventor: Cavit Akin, Warrenville, Ill.

[73] Assignee: Standard Oil Company (Indiana), Chicago, Ill.

[21] Appl. No.: 890,579

[22] Filed: Mar. 20, 1978

[51] Int. Cl.² ............................................. A23J 3/00
[52] U.S. Cl. ................................. 426/276; 264/181; 264/202; 264/310; 426/656; 426/657; 426/517; 426/802
[58] Field of Search ............... 426/276, 656, 657, 512, 426/516, 517, 802, 803; 264/181, 202, 310, 168, 14, 180; 260/112 R, 112 G

[56] References Cited

U.S. PATENT DOCUMENTS

| | | | |
|---|---|---|---|
| 3,049,755 | 8/1962 | Aizawa et al. | 264/181 |
| 3,084,384 | 4/1963 | Denyes et al. | 264/181 |
| 3,240,852 | 3/1966 | Denyes | 264/181 |
| 3,452,129 | 6/1969 | Isobe et al. | 264/181 X |
| 3,794,731 | 2/1974 | Dannert et al. | 426/276 |
| 3,887,692 | 6/1975 | Gilman | 264/14 X |
| 3,889,010 | 6/1975 | Brouwer | 426/276 |
| 3,987,213 | 10/1976 | Hawkins | 426/276 X |

FOREIGN PATENT DOCUMENTS 7507403  6/1975  Netherlands ............................. 426/276

Primary Examiner—Arthur L. Corbin
Attorney, Agent, or Firm—Gregory E. Croft; Arthur G. Gilkes; William T. McClain

[57] ABSTRACT

Stretched fibers or fibrils from single-cell dopes are prepared by extruding the dope into a moving coagulating bath wherein the fluid motion of the bath causes the extrudate to gradually stretch. The resultant stretched fibers are useful as textured food products.

6 Claims, 4 Drawing Figures

METHOD FOR STRETCHING A COAGULABLE EXTRUDATE

BACKGROUND OF THE INVENTION

1. Field of the Invention

This invention relates to methods of preparing fibrous products by extrusion of dopes into coagulating baths. More particularly, it relates to a method of preparing gradually stretched fibers from a single-cell dope extrudate which is exposed to a moving liquid coagulating bath of increasing velocity which causes the extrudate to gradually stretch.

2. Description of the Prior Art

The preparation of proteinaceous textured food products by spinneret extrusion into a coagulating bath is old in the art. The products so produced can be used as a partial substitute for meats since they generally have a protein content of about 50 percent or more.

One example of such a prior art process is described in U.S. Pat. No. 2,682,466 to Boyer. The filaments are generally produced by dispersing the protein starting material in a suitable dispersing medium such as an alkaline aqueous solution. The dispersion is then forced through a spinneret die and passes into a coagulating bath, which is generally an acid salt solution, causing the streamlets coming through the spinneret to be precipitated into the form of filaments. The resulting filaments are then stretched to provide the orientation and toughness required to simulate meat fibers. Stretching of the filaments was accomplished through the use of a take-up roll or a series of rolls rotating at increasing speeds.

A different approach to fiber formation is illustrated by U.S. Pat. No. 3,794,731 (1974) to Dannert et al. In this process, the protein fibers are prepared by extruding the alkaline protein solution through the die and intimately contacting the extrudate with a fast acting acid gas traveling at a velocity greater than the extrudate. The acid gas causes the proteins to coagulate to form fibers, and the speed and direction of the gas are such to cause a reduction in the diameter of the coagulating fibers due to a pulling action. The resulting fibers are then recovered by various means.

Another approach is illustrated by U.S. Pat. No. 3,889,010 (1975) to Brouwer. In this process the protein solution is foamed prior to extrusion such that the foam contains not more than 50 volume percent liquid. The foam is then extruded into the coagulating bath so that the relatively low density of the foam causes the extrudate to rise as the gas bubbles escape. This rising action consequently causes the extrudate to be stretched so long as the rate of extrusion is slower than the speed of the rising foamed extrudate. Additional stretching is obtained if the coagulating bath is recirculated such that the bath flows parallel to the path of the extrudate. The product is recovered by a take-up roll.

It has been found that the use of rollers such as are used in the various processes exemplified by the Boyer patent is often cumbersome and costly, particularly when applied to the texturization of protein materials. Also, the use of an acid gas as the coagulating agent as exemplified by the Dannert et al. patent can provide operational difficulties on a commercial scale due to the corrosive nature of the acid gas. In addition, a process of the type illustrated by the Brouwer patent is rate-limited by the speed at which the foamed extrudate will rise, and the composition of the extrudate is similarly limited by the necessity of having a sufficient gas content. And furthermore, neither of the two processes last mentioned provides a means for gradually stretching the extruded filaments by exposing them to a gradually increasing pulling force.

Therefore, it is an object of this invention to provide a method of gradually stretching a coagulable extrudate without the use of rollers or gaseous moving agents. This and other objects will become apparent upon further reading of this specification.

SUMMARY OF THE INVENTION

Generally, the invention resides in a method for gradually stretching a coagulable extrudate comprising immersing the extrudate in a moving coagulating bath of continuously increasing velocity wherein the fluid motion of the bath past the surface of the extrudate causes the extrudate to gradually stretch.

In one specific aspect, the invention resides in a method for preparing a gradually stretched fiber from a proteinaceous dope comprising the steps of: (a) extruding the proteinaceous dope into a moving coagulating bath within an extrusion zone wherein the velocity of the coagulating bath is about equal to the velocity of the extrudate; (b) passing the extrudate into a primary stretching zone wherein the velocity of the bath is gradually increased; (c) passing the stretched extrudate from the primary stretching zone to a curing zone wherein the velocity of the bath is maintained about constant and at a value greater than the velocity of the extrudate; and (d) passing the extrudate from the curing zone to a release zone wherein the velocity of the bath is decreased and wherein the resulting stretched fibers are collected. In all aspects of this invention, the proteinaceous dope can comprise single-cell organisms, particularly yeasts.

In another specific aspect, the invention resides in a method for preparing a stretched fiber or fibrils from a proteinaceous dope comprising extruding the proteinaceous dope into a vortexing coagulating bath wherein the extrudate is stretched along the spiral path of the vortex and collected near the apex of the vortex. The vortex can be advantageously created by agitation within the bath container or simply by the presence of a drain hole, which also facilitates collection of the product.

In still another specific aspect, the invention resides in a method for preparing stretched fibers or fibrils from a proteinaceous dope comprising extruding the proteinaceous material into the coagulating bath contained within the annular space between a stationary cylinder and a rotating conical segment, wherein the extrudate is subjected to increasing velocity and gradual stretching as it spirals toward the apex of the conical segment.

DESCRIPTION OF THE PREFERRED EMBODIMENTS

Figure 1:
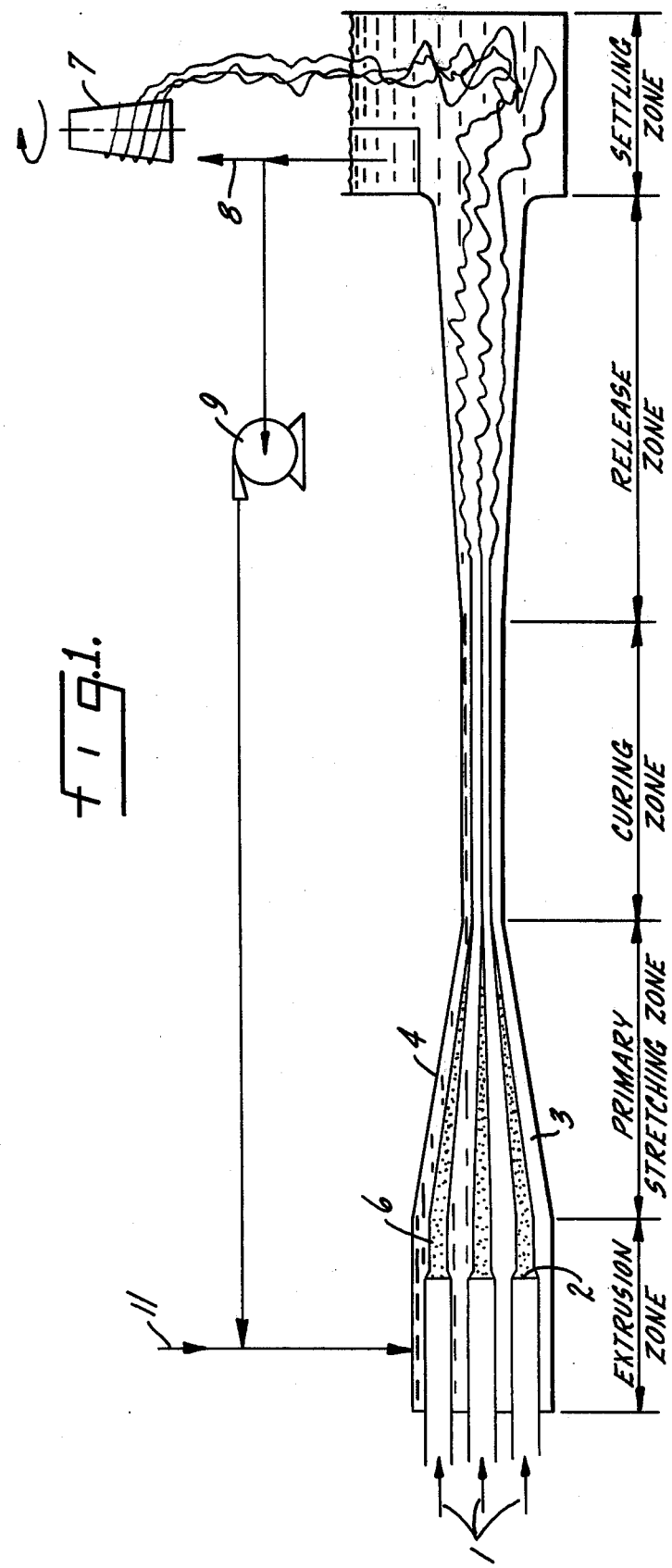
FIG. 1 is a schematic illustration of one specific embodiment of this invention wherein the extrudate is gradually stretched by passing it through an apparatus having an extrusion zone, a primary stretching zone, a curing zone, and a release zone.

For purposes of this specification and claims, the term "dope" shall mean any dispersion or colloidal suspension or solution containing a coagulable material. The dope specifically can comprise single-cell organisms or materials derived therefrom, but the methods and apparatus of this invention are not to be construed as being limited to such dope compositions. As an example of a general alkaline protein dope recipe, however, a typical dope composition might contain about 80–100 grams of a protein product which product contains at least 35 percent protein. the protein product is added to about 200–250 grams of water containing about 10–20 grams KOH or NaOH and heated at 80°–100° C. with mixing for about 15 minutes until a slightly viscous slurry is obtained. Suitable protein products for this purpose can be selected from single-cell proteins such as yeasts; plant proteins such as soybean products, cereal proteins, and cottonseed proteins; animal proteins such as egg, milk, or meat proteins; or a combination of any of these materials.

Coagulating bath compositions will vary according to the dope composition as will be readily appreciated by those skilled in the art. Specific bath compositions for alkaline dopes would include (a) 5% acetic acid in water, (b) 5% acetic acid in 40–80% ethanol and 20–60% water, or (c) 5% acetic acid plus 1% $CaCl_2$ in water. Other food grade acids such as hydrochloric acid, phosphoric acid, lactic acid, citric acid, etc. can also be used. The temperature of the bath can be room temperature but need not be. The concentration of the acids and the temperature of the bath must be optimized experimentally for the specific dope being used and the final properties desired. The use of salts such as $CaCl_2$ are known to harden the texture of texturized proteins and other salts such as sodium chloride and phosphate salts of sodium and potassium can also be used for this purpose. The bath may also contain flavoring agents for flavored textured products, soluble vitamins, and food colorings to be absorbed by the textured product.

Directing attention to the Drawing, certain aspects of this invention will be described in greater detail.

FIG. 1 illustrates on continuous embodiment of a process and apparatus for gradually stretching fibers. The dope 1 is extruded through die holes 2 (larger than 0.003 inch diameter for single-cell dopes) into the coagulation or insolubilization bath 3 contained within the stretching tube 4. At the Extrusion Zone the linear flow rates of the extrudate 6 and the bath liquid are kept identical in the preferred procedure. The linear flow rate of the liquid can, however, be slightly greater than that of the extrudate 6 at this point. The preferred flow pattern at this zone is laminar. At the Primary Stretching Zone the stretching tube is tapered such that the diameter is gradually reduced. This taper causes the linear flow rate of the bath liquid to be gradually increased. The gradual increase in the flow rate of the liquid in turn induces continuous gradual stretching on the extrudate, producing thin fibers with oriented molecular structure. This stretching can be further controlled by varying either the bath liquid flow rate or the rate of extrusion. At the Curing Zone the diameter of the stretching tube is constant, thus the linear flow rate of the bath liquid in this zone is also maintained constant. The linear flow rate of the fibers in this zone is lower than the linear flow rate of the liquid, causing further stretching of the fibers while the insolubilization is completed. At the Release Zone the stretching tube has a reverse taper such that the diameter of the tube gradually increases. Here the extruded fibers are partially curled as the stretching action diminishes. The fibers are allowed to accumulate randomly at the Settling Zone before being collected on a spindle 7. As an alternate procedure, the fibers can be collected directly on a roll or spindle without curling or random settling. In either case a portion of the bath liquid is discarded as a purge stream 8. The remainder of the bath liquid is recirculated to the Extrusion Zone via recirculating pump 9. The make-up coagulation bath 11 is added to the recirculation line and the combined stream is directed back into the Extrusion Zone.

The extrusion rate, the extrudate and bath liquid flow rates, the tube diameter, the degrees of taper in the stretching tube, the length of the zones, the dope viscosity, the bath strength, the die orifice size, and the fiber strength are variables which give flexibility to the operation of such a system and which will be readily optimized by one skilled in the art without undue experimentation. In this regard, the dimensions of the stretching tube will be readily determined for a desired flow rate based on the requirement of laminar flow.

The advantages of this embodiment over conventional processes are its simplicity and versatility. For single-cell protein dopes, this process does not require extremely small extrusion orifices, such as are found in spinneret dies, thus reducing the dope feed pressure. Also, continuous and gradual stretching is practically impossible with the conventional roller system. Furthermore, the equipment and control requirements are considerably less in this process than for conventional processes. Thus the initial and operational costs are further reduced.

Figure 2:
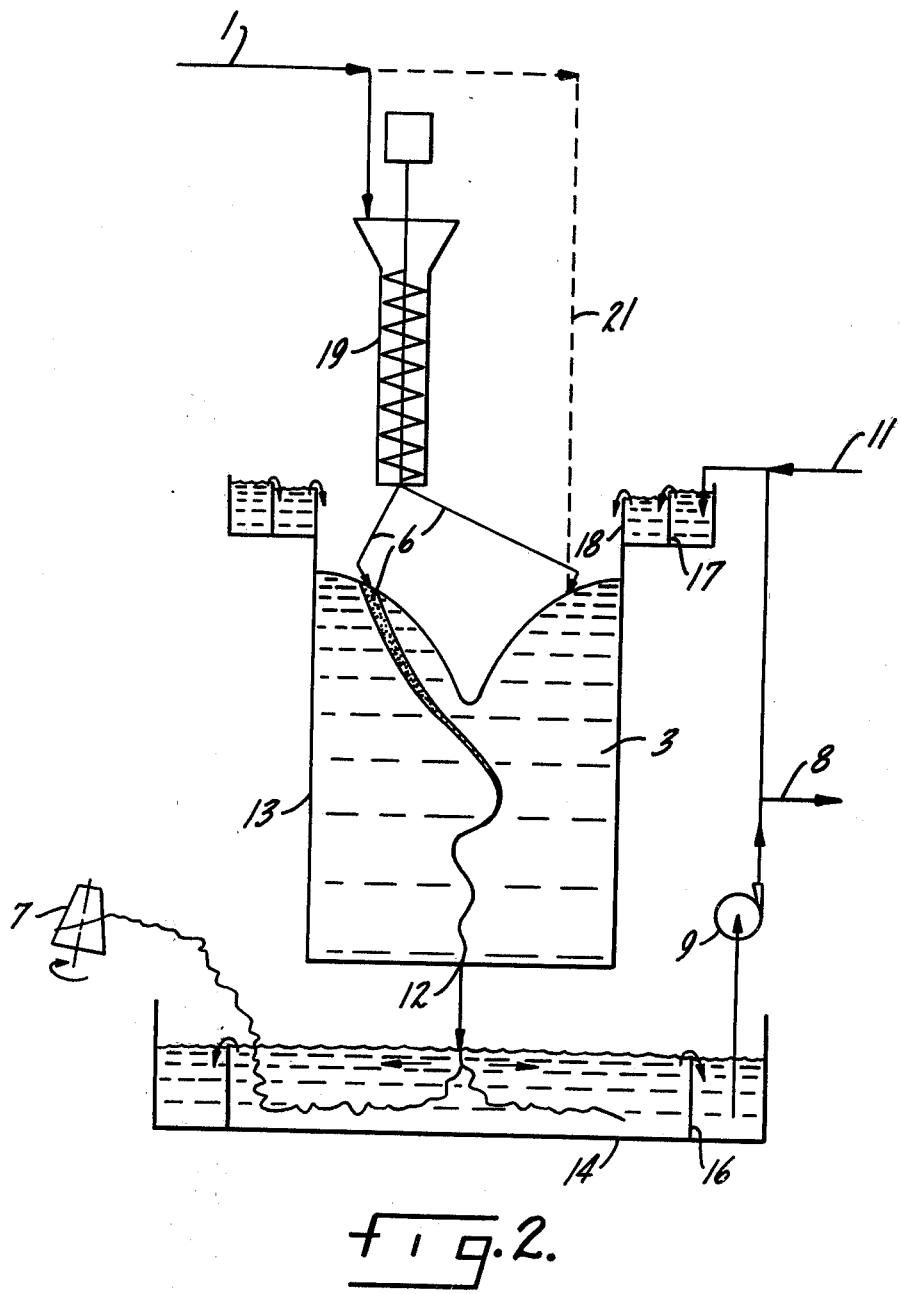
FIG. 2 is a schematic illustration of another specific embodiment of this invention wherein the extrudate is extruded into a vortexing coagulating bath wherein the vortex is created by a drain hole in the bottom of the bath container.

FIG. 2 illustrates another continuous embodiment using the velocity gradients developed within a vortexing liquid to gradually stretch the fibers. Specifically, when a liquid in a cylindrical tank is allowed to discharge through a hole at the midpoint of the bottom, the flow will eventually acquire a spiral motion. The tangential component of this motion is very nearly inversely proportional to the radial distance from the axis (velocity × radial distance = constant). The primary characteristic of such motion is the tendency of every element to resist rotation, and this resistance increases with the radial distance from the axis. Thus a fiber which is extruded from a point near the wall towards the axis is exposed to gradually increased stretch as it comes closer to the axis. Due to the spiral motion of the liquid, the fiber, which may be extruded into the liquid at any point, moves both towards the axis and the bottom of the tank and is consequently stretched. The process and apparatus illustrated in FIG. 2 are based on these principles.

Directing attention then to FIG. 2, the dope 1 is fed to an extrusion device 19 and is extruded into the insolubilization or coagulation bath 3 through either single or multiple orifices. The hole diameter does not have to be small for single-cell protein dopes. The bath liquid is in spiral motion due to the continuous discharge from the drain hole 12 of the bath tank 13. The preferred direction of flow for the extrudate at the point of extrusion is generally tangential to the flow of the bath liquid at that point. According to the viscosity and insolubilization characteristics of the dope, the liquid velocity can be slightly greater than the extrusion velocity. With the regulation of the bath discharge rate (and therefore the spiral motion rates), the bath strength (i.e. concentration in bath), the bath temperature, the extrusion point, the initial extrudate diameter, the extrudate viscosity, and the bath dimensions, etc., continuous stretched fibers of various dimensions are deposited and settled in the discharge tank 14. The fibers may be collected on a spindle 7 or optionally by any other suitable means.

The liquid level of the coagulating bath is kept constant by recirculating liquid from the discharge tank 14 via a recirculating pump 9. Part of the used bath liquid is discarded as a purge stream 8 while make-up bath liquid 11 is added to the recirculating stream. An even liquid flow pattern is maintained through the use of a series of overflow weirs 16, 17, and 18.

As an alternative to extruding the dope into the coagulating bath, the extruder 19 can be bypassed and the dope can be directly added 21 to the bath through either single and multiple spouts. For purposes of this specification and claims, a stream of dope which is poured is considered to be the equivalent of an extrudate.

By using an extrusion or dope flow rate which is slower than the tangential flow rate of the bath liquid at the point of injection, gradually and continuously stretched fibrils are obtained. The type and dimensions of the fibrils are dependent on the dope or slurry viscosity, the difference between the flow rates of the dope and the bath liquid, bath strength, bath dimensions, bath discharge rate, etc. The performance of the system and the quality of the fibers and fibrils obtained may also be modified by changing the shape of the bath, e.g., using a conical bottom tank and applying other techniques as foreseen by the fluid dynamics of such a system. Any such variations are intended to be within the scope of this invention even though they may not be specifically set forth herein.

Figure 3:
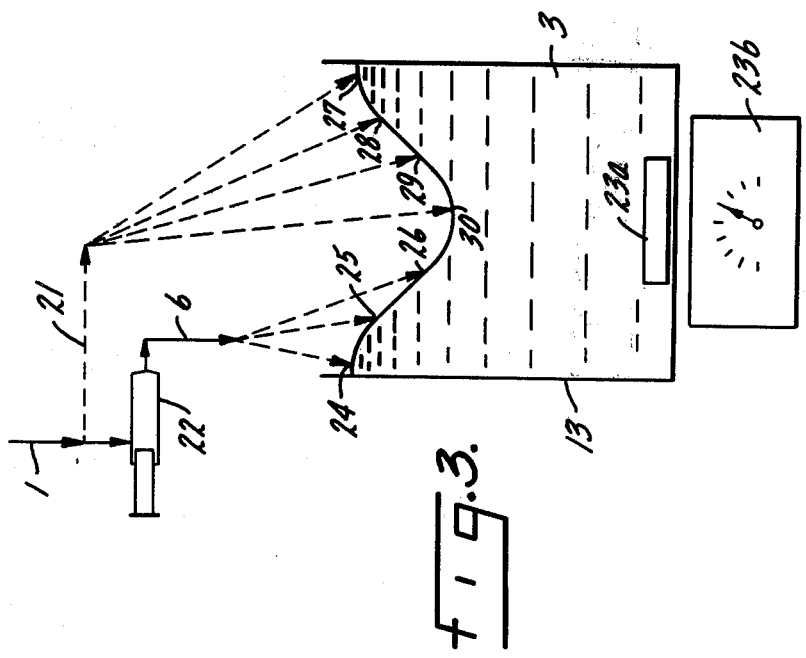
FIG. 3 illustrates an embodiment similar to that shown in FIG. 2, except the vortex is created by stirring.

FIG. 3 illustrates yet another embodiment of this invention which is similar to that shown in FIG. 2, except the vortex in this embodiment is created by stirring rather than by a drain hole. This creates a different type of flow pattern than is produced by the embodiment illustrated in FIG. 2. Theoretically speaking, when a vortex forms by stirring the liquid in a vertical cylindrical container, the liquid particles are subjected to two types of motion: the motion around the axis of the container and the vertical motion. The tangential velocity around the axis increases in the radial direction up to a point and drops to zero at the container wall. The vertical motion however presents a somewhat more complicated picture. If the stirrer zone is ignored, proceeding radially from the axis the velocity first reaches a maximum, gradually diminishes in value, reaches a low point, increases again, reaches another maximum and becomes zero at the wall. With the combined effect of the axial and vertical motions, a particle at the surface of the liquid moves towards the bottom of the liquid with an accelerated spiral motion. A particle which is not identical with liquid particles will follow the same combined motion pattern with drag. When viscous dope is introduced at or near the surface, the extrudate segments which contact the liquid at an earlier time have a faster linear flow rate than those segments which contact the liquid at a later time. Thus the fiber will be stretched continuously and gradually. The thickness and the molecular orientation of the product fiber will vary according to such factors as the viscosity of the dope, the dope-liquid specific gravity difference, the rate of agitation, the volume of bath, the diameter and height of the bath, and the point of extrusion. If the extrusion rate is not sufficient to accomodate for the stretch, the extrudate will break and fibrils of practically uniform size and dimensions are obtained. The fibers and fibrils eventually accumulate at the dead spots of the bath and can be continuously removed by any suitable means.

In our experiments, this process was used for the batchwise production of single cell protein fibers and fibrils. Specifically, a dope 1 was prepared by mixing 300 g. of bakers yeast cake with 15 g. solid KOH and heated 15 minutes in a boiling water bath to obtain a slightly viscous slurry. The dope was extruded through a syringe 22 near the top, but underneath the surface, of an ethanol+acetic acid (5%) coagulation bath 3 at various points. The bath was stirred with a magnetic stirrer (23a and 23b). As an alternate means for introducing the dope into the coagulation bath the viscous dope was directly added 21 into the bath at various points along the surface of the bath by pouring the dope from the spout of a beaker. The syringe extrudate was about 0.6 mm. in diameter as it left the orifice, whereas the poured dope was as thick as 4 mm. in diameter. The various locations at which the dope was introduced to the coagulating bath are indicated in FIG. 3 by reference numerals 24, 25, 26, 27, 28, 29, and 30. The results are shown in the following TABLE.

TABLE

| Type of Injection | Location | Rate of Injection | Rate of Agitation | Observations & Product |
|---|---|---|---|---|
| Extrude | Near Wall (24) | Slow | Slow | Visible stretch -Long curled fiber. Curling occurs at the bottom. |
| Extrude | High Speed Zone (25) | Slow | Slow | Visible stretch Frequent fiber breakage |
| Extrude | High Speed Zone (25) | Slow | Intermediate | Stretched about 6 mm long fibrils shaped like meat fibrils |
| Extrude | High Speed Zone (25) | Rapid | Intermediate | Stretched spindle shaped fibrils |
| Extrude | Close to vortex (26) | Rapid | Rapid | Spindle shaped short fibrils, some flaking |
| Pour | Near wall (27) | Slow | Slow | Irregularly shaped large particles |
| Pour | High Speed Zone (28) | Slow | Intermediate | Tear drop shaped particles, spindle shaped short fibrils, some flaking |
| Pour | Near Vortex (29) | Rapid | Rapid | Spindle shaped short fibrils, some flaking |
| Pour | At Vortex (30) | Rapid | Rapid | Very short fibrils, some flaking |

The fibers and fibrils so obtained were recovered and washed with ethanol and dried under infrared light or in vacuum at room temperature. The dry products were white to yellow in color. The fibrils formed chewable mats. When the dry products were soaked in water, no dispersion was observed. Similar results were obtained when a water+acetic acid (5%) coagulating bath was used instead of the ethanol-acetic acid bath, although more flaking of the product occurred with water-acetic acid bath. The flaking was reduced when a water+acetic acid (5%)+CaCl₂ (1%) bath was used. Also, the products resulting from use of the water+acetic acid bath exhibited some dispersion when soaked in water.

A broad range of stretching can be expected from this and other embodiments of this invention depending upon the system and the location of the injection point. The diameter reduction in laboratory scale units was observed to be as high as a 100:1 reduction.

Figure 4:
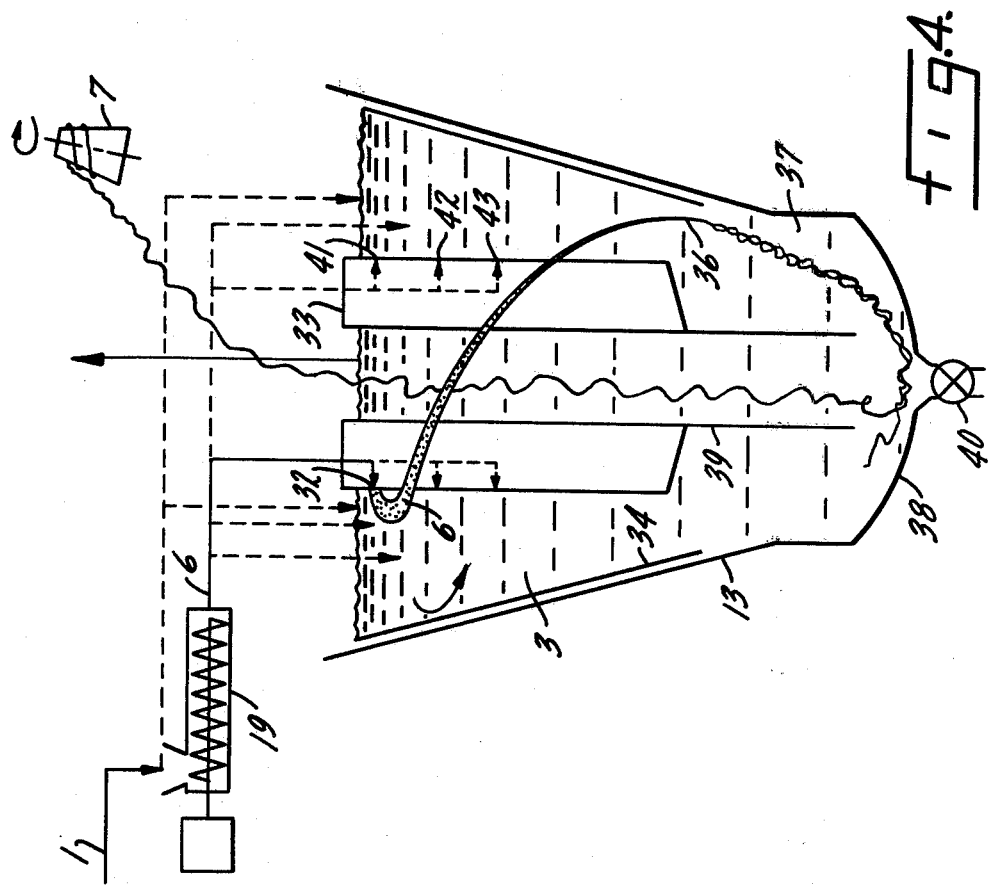
FIG. 4 is a schematic illustration of still another specific embodiment of this invention wherein the extrudate is extruded into the annular space between a stationary cylinder and a rotating conical segment.

FIG. 4 illustrates still another specific embodiment of this invention wherein the dope is introduced into the coagulating bath which occupies the annular space between a stationary cylinder and a rotating conical segment. Theoretically, ignoring vertical movement, when a liquid is placed in an annular space between two coaxial cylinders, an outer cylinder which is rotating at an angular velocity and an inner cylinder which is stationary, the liquid develops a laminar flow pattern with a velocity distribution along the radial direction expressed as:

$$V_\theta = R V_0 \frac{\frac{kR}{r} - \frac{r}{kR}}{k - \frac{1}{k}}$$

where:
r = distance from the center along the radial direction
$V_\theta$ = tangential liquid velocity at r distance from the axis
$V_O$ = angular velocity of the outer cylinder
R = radius of the outer cylinder
kR = radius of inner cylinder
and it is assumed that:
$V_\theta = 0$ at $r = kR$
$V_\theta = V_O R$ at $r = R$ Any fiber or fibril which is located in the liquid is dragged with the liquid flow at gradually increased levels and thus stretched in a continuous gradual manner. However, real systems include vertical velocity gradients as well as the radial velocity gradients, but the mathematics are too complex to be of value here. However, directing attention specifically to FIG. 4, the practical aspects of the operation of such a system will be described in greater detail.

The slurry or dope 1 is fed to an extruder 19 and extruded at the wall 32 of the stationary cylinder 33 into the coagulation or insolubilization bath 3 which is subjected to annular laminar flow with radial and vertical velocity gradients induced by a rotating tapered (conical) segment 34 positioned within the bath tank 13 and suitably connected to a drive means to cause axial rotation relative to the stationary cylinder 33. The relatively thick extrudate 6 is exposed to a gradually increasing rate of liquid flow and drag as it moves radially outward and vertically downward with a spiral motion. Thus the extrudate is gradually stretched to form a thin stretched fiber 36. The thin stretched fiber is slightly curled by itself at the no-motion zone 37 and settles at the dish or conical bottom 38 of the tank. The fibers are allowed to settle at the bottom in a random pattern and collect to form fibrous mats. The fibrous material can then be removed through the valve 40 provided in the tank bottom. Optionally the fibers can be removed from the bottom of the tank as a continuous filament through the inner tube 39 which passes through the center of the stationary cylinder and be collected on a bobbin or spindle 7 if so desired.

Optionally, multiple orifices such as those located at points 41, 42, and 43 along the stationary cylinder can be used to introduce the dope to the bath. Also, the extrusion points can be located away from the stationary cylinder at points such as indicated by the dashed arrows in FIG. 4. As an alternate, the dope can be added directly to the bath at desired spots by simply pouring it through single or multiple spouts as indicated. A portion of the used bath can be removed continuously or batchwise as a purge and make-up bath liquid can be added as desired.

If fibers lighter than the bath liquid are produced, the apparatus can be built to accommodate the floating of the light fiber, e.g., the tapering is reversed to provide a gradual vertical increase of the annular tangential flow rates.

By regulating the extrusion rate (usually a slower extrusion rate) stretched fibrils instead of fibers are obtained.

It will be apparent to those skilled in the art that many variations from the specific embodiments, shown for purposes of illustration, can be made without departing from the scope of this invention.

I claim:

1. A method for gradually stretching a coagulable extrudate comprising injections the coagulable extrudate into a vortexing coagulating bath, wherein the extrudate is gradually stretched along the spiral path of the vortex, and collecting the stretched extrudate near the apex of the vortex.

2. The process of claim 1 wherein the coagulable extrudate is an extruded dope comprising single-cell protein organisms.

3. The process of claim 2 wherein the single-cell protein organisms are yeast.

4. The process of claim 1 wherein the vortex is created by agitation within the coagulating bath container.

5. The process of claim 1 wherein the vortex is created by a drain hole in the coagulating bath container.

6. A method for gradually stretching a coagulable extrudate comprising injecting a coagulable extrudate into a coagulating bath contained within an annular space between a stationary cylinder and a concentric rotating conical segment wherein the extrudate is subjected to increasing velocity and gradually stretching as it spirals toward the apex of the conical segment.

* * * * *

UNITED STATES PATENT OFFICE
CERTIFICATE OF CORRECTION

Patent No. 4,154,856     Dated May 15, 1979

Inventor(s) Cavit Akin

It is certified that error appears in the above-identified patent and that said Letters Patent are hereby corrected as shown below:

| Patent Column | Line | |
|---|---|---|
| 3 | 21 | "the" should be --The-- |
| 3 | 52 | "on" should be --one-- |
| 8 | 39 | "injections" should be --injecting-- |
| 8 | 58 | "gradually" should be --gradual-- |

Signed and Sealed this

Sixth Day of November 1979

[SEAL]

Attest:

RUTH C. MASON
*Attesting Officer*

LUTRELLE F. PARKER
*Acting Commissioner of Patents and Trademarks*